(12) United States Patent
Hanamoto

(10) Patent No.: US 9,257,075 B2
(45) Date of Patent: Feb. 9, 2016

(54) LIQUID CRYSTAL DISPLAY APPARATUS AND METHOD FOR CONTROLLING THE SAME

(75) Inventor: Nobuyuki Hanamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 13/450,707

(22) Filed: Apr. 19, 2012

(65) Prior Publication Data

US 2012/0281025 A1 Nov. 8, 2012

(30) Foreign Application Priority Data

May 2, 2011 (JP) ................................ 2011-102840
Feb. 24, 2012 (JP) ................................ 2012-038661

(51) Int. Cl.
*G09G 5/00* (2006.01)
*G09G 3/36* (2006.01)
*G09G 3/34* (2006.01)
G09G 5/02 (2006.01)
G02F 1/1335 (2006.01)

(52) U.S. Cl.
CPC ............ *G09G 3/3413* (2013.01); *G09G 3/3607* (2013.01); *G02F 1/133514* (2013.01); *G02F 1/133621* (2013.01); *G09G 5/02* (2013.01); G09G 2310/0235 (2013.01); G09G 2320/0666 (2013.01); G09G 2340/06 (2013.01)

(58) Field of Classification Search
CPC ....... G09G 3/36; G09G 3/3607; G09G 5/026; G09G 5/034; G09G 5/2074; G09G 5/3607; G09G 2340/10; G09G 2370/12; G09G 3/2074; G09G 3/3406; G09G 3/3413; G09G 2300/0439; G09G 2300/0443; G09G 2300/0452; G09G 2320/0233; G09G 2320/0242; G02B 5/20

USPC .................................. 345/88, 102, 690, 694
See application file for complete search history.

(56) References Cited

U.S. PATENT DOCUMENTS

2005/0001787 A1* 1/2005 Montgomery et al. ............ 345/6
2008/0150880 A1* 6/2008 Inuzuka et al. ................ 345/102
2008/0150882 A1* 6/2008 Langendijk et al. .......... 345/102

(Continued)

FOREIGN PATENT DOCUMENTS

CN 1795486 A 6/2006
CN 1854830 A 11/2006

(Continued)

OTHER PUBLICATIONS

May 4, 2014 Chinese Office Action, that issued in Chinese Patent Application No. 201210135146.8.

*Primary Examiner* — Kent Chang
*Assistant Examiner* — Herbert L Hagemeier
(74) *Attorney, Agent, or Firm* — Cowan, Liebowitz & Latman, P.C.

(57) ABSTRACT

The light sources are controlled by dividing a display period of one frame into such a first subframe period that blue transmitted light is obtained from the blue subpixel and red transmitted light is obtained from the red subpixel by turning ON the light sources of the blue color and the red color and such a second subframe period that green transmitted light is obtained from the green subpixel by turning ON a light source of a green color and at least any one of a procedure in which cyan transmitted light is obtained from the blue subpixel and a procedure in which yellow transmitted light is obtained from the red subpixel is performed.

7 Claims, 12 Drawing Sheets

(56) References Cited

U.S. PATENT DOCUMENTS

| | | | |
|---|---|---|---|
| 2009/0135129 A1* | 5/2009 | Roth et al. | 345/102 |
| 2010/0020007 A1* | 1/2010 | You et al. | 345/102 |
| 2010/0039587 A1* | 2/2010 | Li et al. | 349/68 |
| 2010/0214311 A1* | 8/2010 | Roth | 345/590 |
| 2011/0122176 A1* | 5/2011 | Numao | 345/690 |

FOREIGN PATENT DOCUMENTS

| | | | | |
|---|---|---|---|---|
| JP | 2004-118133 | | 4/2004 | |
| JP | WO2010021184 | * | 6/2009 | ............... G09G 3/36 |
| JP | 4451616 B2 | | 4/2010 | |
| WO | 2010021184 A1 | | 2/2010 | |

* cited by examiner

|  | | ONE FRAME | |
|---|---|---|---|
|  | | FIRST SUBFRAME | SECOND SUBFRAME |
| LIGHT SOURCE | RED | TURN ON | TURN OFF |
| | GREEN | TURN OFF | TURN ON |
| | BLUE | TURN ON | TURN OFF |
| SUBPIXEL | RED | TRANSMISSION COLOR: RED 301 | TRANSMISSION COLOR: YELLOW 302 |
| | GREEN | SHIELD | TRANSMISSION COLOR: GREEN 303 |
| | BLUE | TRANSMISSION COLOR: BLUE 305 | TRANSMISSION COLOR: CYAN 304 |

*Fig.5A*

|  | | ONE FRAME | |
|---|---|---|---|
|  | | FIRST SUBFRAME | SECOND SUBFRAME |
| LIGHT SOURCE | RED | TURN ON | TURN OFF |
| | GREEN | TURN OFF | TURN ON |
| | BLUE | TURN ON | TURN OFF |
| SUBPIXEL | RED | TRANSMISSION COLOR: RED 301 | SHIELD |
| | GREEN | SHIELD | TRANSMISSION COLOR: GREEN 303 |
| | BLUE | TRANSMISSION COLOR: BLUE 305 | TRANSMISSION COLOR: CYAN 304 |

*Fig.5B*

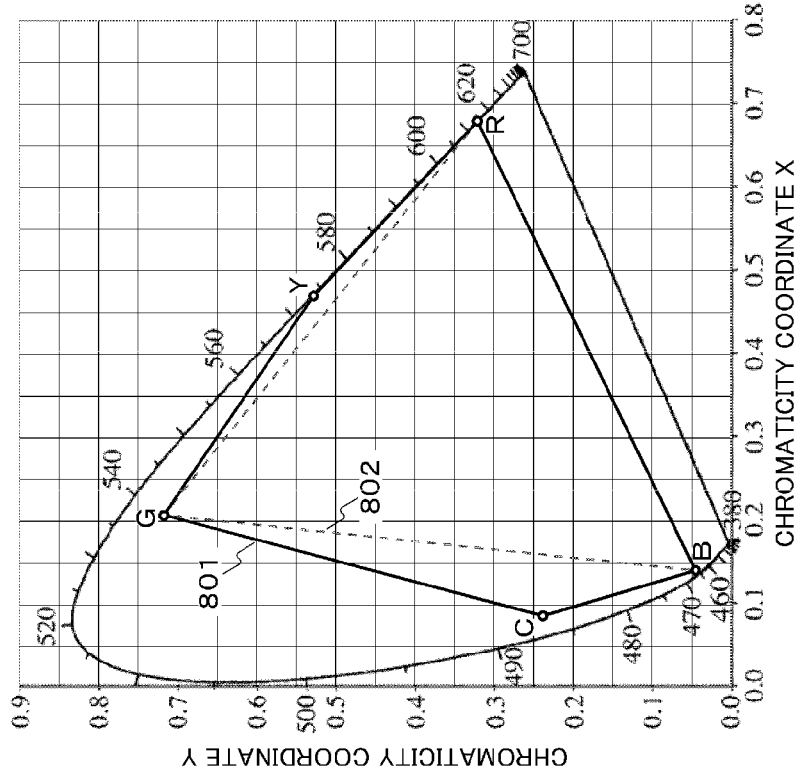

| | | ONE FRAME | |
|---|---|---|---|
| | | FIRST SUBFRAME | SECOND SUBFRAME |
| LIGHT SOURCE | RED | TURN ON | TURN OFF |
| | GREEN | TURN OFF | TURN ON |
| | BLUE | TURN ON | TURN OFF |
| SUBPIXEL | RED | TRANSMISSION COLOR: RED 901 | TRANSMISSION COLOR: FIRST YELLOW 902 |
| | GREEN | TRANSMISSION COLOR: SECOND YELLOW / SECOND CYAN 906 | TRANSMISSION COLOR: GREEN 903 |
| | BLUE | TRANSMISSION COLOR: BLUE 905 | TRANSMISSION COLOR: FIRST CYAN 904 |

*Fig.10A*

| | | ONE FRAME | |
|---|---|---|---|
| | | FIRST SUBFRAME | SECOND SUBFRAME |
| LIGHT SOURCE | RED | TURN ON | TURN OFF |
| | GREEN | TURN OFF | TURN ON |
| | BLUE | TURN ON | TURN OFF |
| SUBPIXEL | RED | TRANSMISSION COLOR: RED 901 | TRANSMISSION COLOR: FIRST YELLOW 902 |
| | GREEN | TRANSMISSION COLOR: SECOND CYAN 906 | TRANSMISSION COLOR: GREEN 903 |
| | BLUE | TRANSMISSION COLOR: BLUE 905 | TRANSMISSION COLOR: FIRST CYAN 904 |

*Fig.10B*

LIQUID CRYSTAL DISPLAY APPARATUS AND METHOD FOR CONTROLLING THE SAME

BACKGROUND OF THE INVENTION

1. Field of the Invention

The present invention relates to a liquid crystal display apparatus and a method for controlling the same.

2. Description of the Related Art

In general, the color reproduction range of a liquid crystal display apparatus is determined by the product of the spectral wavelength characteristic of a backlight light source and the spectral wavelength transmission characteristic of a color filter. When the color reproduction is performed by means of subpixels of the three primary colors of red, green, and blue for constructing pixels, the color gamut area, in which the colors can be reproduced, is limited to an area disposed at the inside of a triangle formed by connecting apexes of chromaticity points of the display colors capable of being displayed by the respective subpixels.

A method, in which two or more types of light sources having different spectral wavelength characteristics are used to perform the time sharing light emission, is known as one of methods for expanding the displayable color gamut area. For example, in the case of a technique described in Japanese Patent Application Laid-open No. 2004-118133, the input image information is subjected to the color matrix conversion according to display colors capable of being displayed by means of the combination of respective light sources and a plurality of subpixels having different spectral wavelength transmission characteristics, and a liquid crystal panel is driven and controlled in synchronization with the time sharing light emission control. Further, in order to avoid the leakage of light from the subpixel of the adjacent color, the concerning subpixel is shielded from light to display the black. Such a technique is suggested thereby that the multi-primary color display, in which the color purity is enhanced, is realized.

SUMMARY OF THE INVENTION

In relation to the spectral wavelength characteristics shown in FIG. 3F, it is conceived to realize the five primary color display in which the yellow color 302 as a color between the red color and the green color and the cyan color 304 as a color between the green color and the blue color are added to the red color 301, the green color 303, and the blue color 305. For this purpose, in the case of the technique described in Japanese Patent Application Laid-open No. 2004-118133, a problem arises such that it is necessary to provide at least the light source or light sources having the spectral wavelength peaks at the red color 301, the green color 303, and the blue color 305 and the light source or light sources having the spectral wavelength peaks of the yellow color 302 and the cyan color 304.

In view of the above, the present invention provides a technique which makes it possible to widen the displayable color gamut as compared with the three primary color display without adding any light source of any other color to the light sources of the three colors without adding subpixels of any other color to the subpixels of the three colors.

A first aspect of the present invention resides in a liquid crystal display apparatus comprising:

a backlight which includes a first light source for emitting light of a first color, a second light source for emitting light of a second color, and a third light source for emitting light of a third color;

a liquid crystal panel which is an assembly of pixels including first subpixels for transmitting the light of the first color therethrough, second subpixels for transmitting the light of the second color therethrough, and third subpixels for transmitting the light of the third color therethrough;

a light source control unit which independently controls the light emission of the first light source, the second light source, and the third light source; and a liquid crystal control unit which controls transmittances of the first subpixels, the second subpixels, and the third subpixels depending on image data, wherein:

the light source control unit controls the light sources by dividing a display period of one frame into a plurality of subframe periods including such a subframe period that, by turning ON the second light source, the light of the second color is transmitted through the second subpixel, and at least any one of a procedure in which light of a fourth color as a color between the first color and the second color is transmitted through the first subpixel and a procedure in which light of a fifth color as a color between the second color and the third color is transmitted through the third subpixel is performed.

A second aspect of the present invention resides in a method for controlling a liquid crystal display apparatus comprising:

a backlight which includes a first light source for emitting light of a first color, a second light source for emitting light of a second color, and a third light source for emitting light of a third color;

a liquid crystal panel which is an assembly of pixels including first subpixels for transmitting the light of the first color therethrough, second subpixels for transmitting the light of the second color therethrough, and third subpixels for transmitting the light of the third color therethrough, the method comprising:

a light source control step of independently controlling the light emission of the first light source, the second light source, and the third light source; and a liquid crystal control step of controlling transmittances of the first subpixels, the second subpixels, and the third subpixels depending on image data, wherein:

the light sources are controlled in the light source control step by dividing a display period of one frame into a plurality of subframe periods including such a subframe period that, by turning ON the second light source, the light of the second color is transmitted through the second subpixel, and at least any one of a procedure in which light of a fourth color as a color between the first color and the second color is transmitted through the first subpixel and a procedure in which light of a fifth color as a color between the second color and the third color is transmitted through the third subpixel is performed.

According to the present invention, it is possible to widen the displayable color gamut as compared with the three primary color display without adding any light source of any other color to the light sources of the three colors without adding any subpixel of any other color to the subpixels of the three colors.

Further features of the present invention will become apparent from the following description of exemplary embodiments with reference to the attached drawings.

BRIEF DESCRIPTION OF THE DRAWINGS

FIG. 5 illustrates the operation of the light sources and the subpixels of the first embodiment.

FIG. 8 shows a chromaticity diagram illustrating a color gamut area in which the color reproduction can be performed in the second embodiment, and FIG. 8 illustrates the operation of the light sources and the subpixels.

FIG. 9 shows a chromaticity diagram illustrating a color gamut area in which the color reproduction can be performed.

FIG. 10 illustrates the operation of light sources and subpixels of the third embodiment.

DESCRIPTION OF THE EMBODIMENTS

First Embodiment

An explanation will be made below about a liquid crystal display apparatus in which multi-primary color light sources are used for a backlight according to a first embodiment of the present invention. In order to explain the concept of the operation principle comprehensively in the first embodiment, the embodiment is provided assuming that the respective light sources have ideal spectral wavelength characteristics and the respective subpixels have ideal spectral wavelength transmission characteristics.

Figure 1:
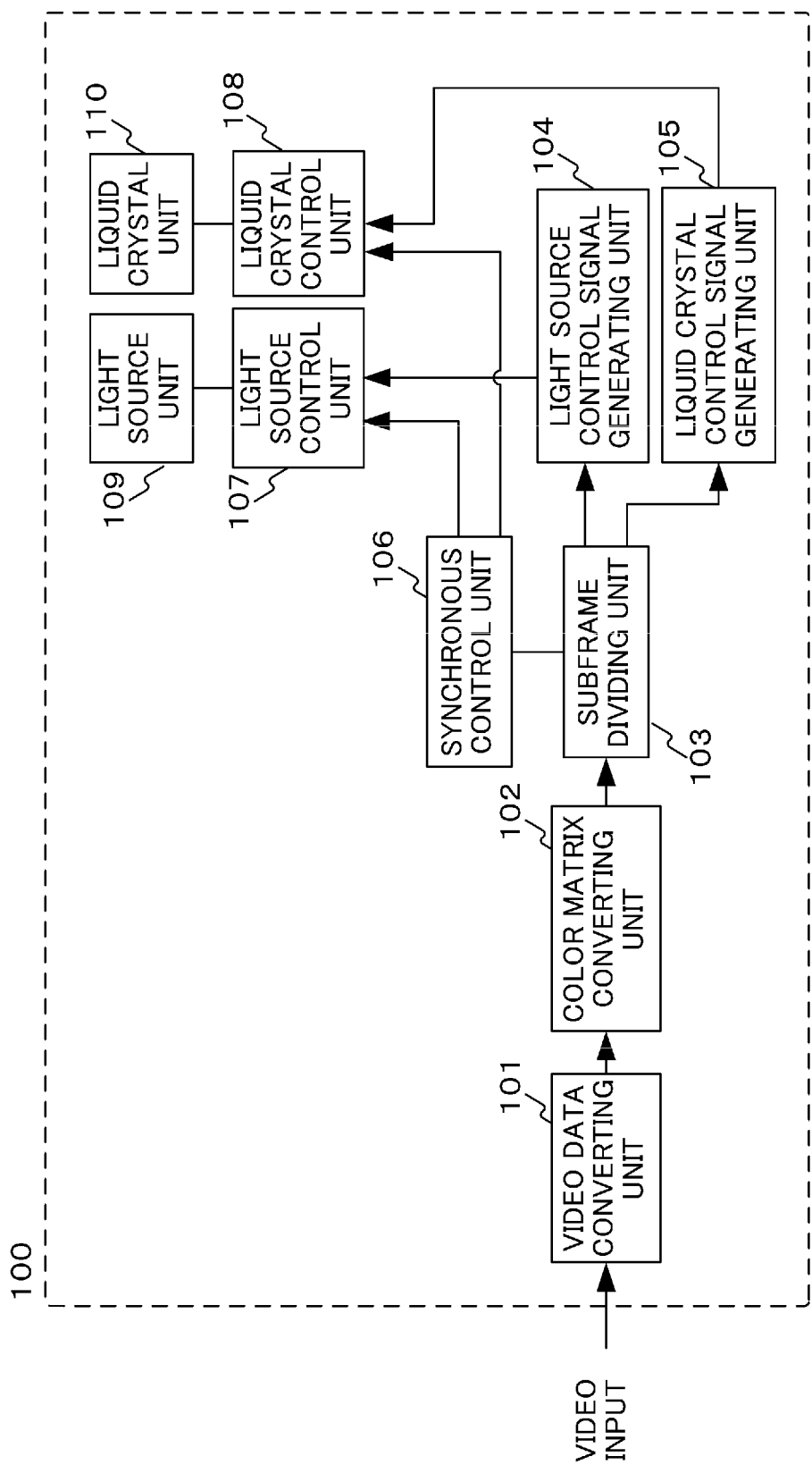
FIG. 1 shows a block diagram illustrating an arrangement of a liquid crystal display processing unit of a first embodiment.

FIG. 1 is a block diagram illustrating an arrangement of a liquid crystal display processing unit 100 included in a liquid crystal display apparatus for realizing the first embodiment. The liquid crystal display processing unit 100 has a video data converting unit 101, a color matrix converting unit 102, a subframe dividing unit 103, a light source control signal generating unit 104, a liquid crystal control signal generating unit 105, a synchronous control unit 106, a light source control unit 107, a liquid crystal control unit 108, a light source unit 109, and a liquid crystal unit 110.

An input video signal, which is inputted from the outside, is converted by the video data converting unit 101 into a digital video signal in pixel unit in conformity with the display resolution of the liquid crystal unit 110, and the signal is outputted to the color matrix converting unit 102. If the scaling process and/or the I/P conversion process is/are required, the video data converting unit 101 performs the processes. The color matrix converting unit 102 performs the color matrix conversion for the digital video signal by using a preset five primary color conversion table to generate a five primary color video signal. The generated five primary color video signal is outputted to the subframe dividing unit 103.

In the first embodiment, one frame image is displayed in a time sharing manner by using two subframes. Therefore, in the subframe dividing unit 103, the five primary color video signal is divided to provide the video signal constructed by the two subframes to generate a subframe video signal. Further, the subframe dividing unit 103 outputs a subframe sync signal to the synchronous control unit 106.

The light source control signal generating unit 104 generates a light source control signal from the subframe video signal in order to control the light emission of the light source unit 109. The liquid crystal control signal generating unit 105 generates a liquid crystal control signal from the subframe video signal in order to drive and control the liquid crystal unit 110. The synchronous control unit 106 generates a synchronous control signal in order to achieve the synchronization between the light source control unit 107 and the liquid crystal control unit 108 on the basis of the subframe sync signal supplied from the subframe dividing unit 103. The synchronous control signal is outputted to the light source control unit 107 and the liquid crystal control unit 108.

The light source control unit 107 independently controls the turning ON (lighting) and the turning OFF (blackout) of the light source of each of the colors of the light source unit 109 on the basis of the light source control signal. The light emission control of the light source unit 109 is synchronized with the control timing of the liquid crystal unit 110 in accordance with the synchronous control signal. The light source unit 109 turns ON the designated light source in accordance with the light emission control of the light source control unit 107. The liquid crystal control unit 108 drives and controls the liquid crystal unit 110 so that the respective subpixels have designated transmittances on the basis of the liquid crystal control signal. The driving control of the liquid crystal unit 110 is synchronized with the control timing of the light source unit 109 in accordance with the synchronous control signal. In the liquid crystal unit 110, the liquid crystal orientation angles of the respective subpixels are changed in accordance with the driving control of the liquid crystal control unit in accordance with the inputted image data, and the transmittances of the respective subpixels are changed thereby.

The internal process of the liquid crystal display processing unit 100 will be explained in further detail by using a flow chart described later on.

Figure 2:
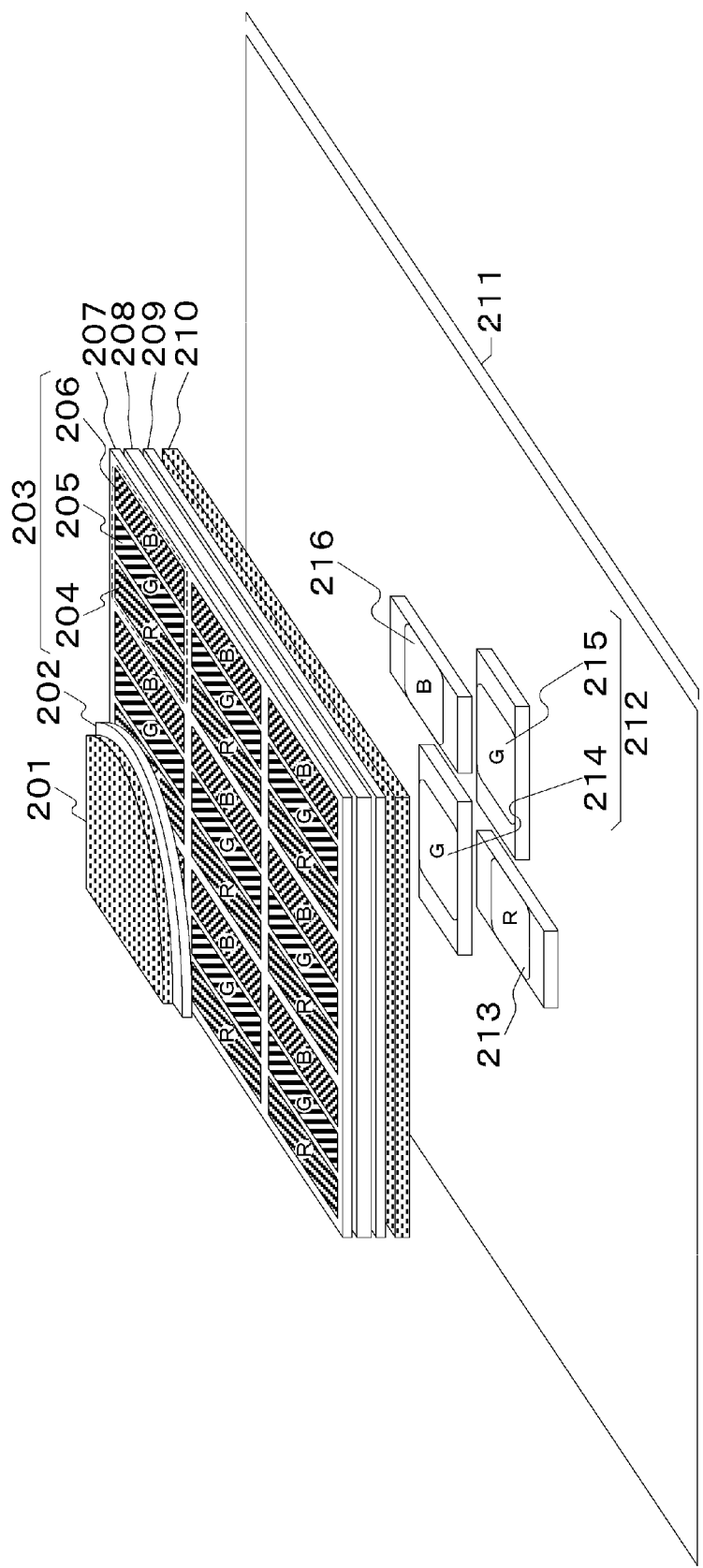
FIG. 2 shows a structure illustrating an arrangement of a light source unit and a liquid crystal unit of the first embodiment.

FIG. 2 shows a structure of a liquid crystal module in which the light source unit (backlight module) 109 and the liquid crystal unit (liquid crystal panel module) 110 are combined with each other. In order that the explanation is comprehensive, a simplified structure is shown in FIG. 2. Actually, in a detailed structure, for example, the spatial distance between the liquid crystal unit 110 and the light source unit 109, the number of light sources, and the layout of light sources are determined while considering, for example, the light source intensity, the diffusion characteristic depending on, for example, the diffusion plate for the light source, and the light source radiation angle.

The light source unit 109 is constructed as the RGGB backlight in which red light sources 213 (third light sources), first green light sources 214, second green light sources 215, and blue light sources 216 (first light sources) are arranged on a backlight surface 211. The backlight surface 211 plays such a role that the light from the light source is diffused and reflected. The first green light source 214 and the second green light source 215 are dealt with as one set which is represented as "green light source group 212 (second light source)". In the first embodiment, it is assumed that the first green light source 214 and the second green light source 215 have an identical spectral wavelength characteristic.

The liquid crystal unit 110 is a transmission type liquid crystal panel, which is constructed by a first light diffusion plate 201, a first polarizing plate 202, a color filter 207, a liquid crystal 208, a second polarizing plate 209, and a second light diffusion plate 210. The liquid crystal unit 110 resides in an assembly of pixels 203 (picture elements) constructed by each one set of a red subpixel 204 (third subpixel), a green subpixel 205 (second subpixel), and a blue subpixel 206 (first subpixel). The first light diffusion plate 201 is provided as a light diffusion plate in order to supplement the field angle. The second light diffusion plate 210 is provided as a diffusion plate in order to diffuse the light from the light source unit 109 and suppress any uneven illuminance and any uneven color of the light allowed to come into the liquid crystal unit 110.

Figure 3A:
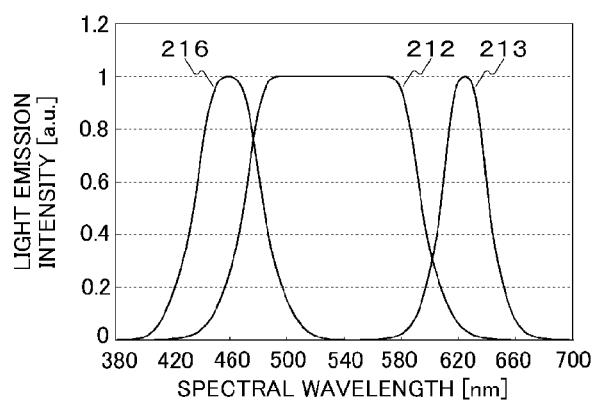
FIG. 3 shows wavelength characteristics of light sources, transmitted lights, and subpixels of the first embodiment.

FIG. 3A shows the spectral wavelength characteristics (light emission spectrums) of the respective light sources in the first embodiment. The red light source 213 is a light source in which the wavelength peak is provided in the red wavelength band and the spectral wavelength band is narrow. Similarly, the blue light source 216 is a light source in which the wavelength peak is provided in the blue wavelength band and the spectral wavelength band is narrow. The light sources make it possible to obtain the sufficient display colors of the red color (third color) and the blue color (first color) even if the band limiting is not applied with the color filter 207. On the other hand, the green light source group 212 constitutes a wide color representation light source having a spectral wavelength characteristic including the cyan color (fourth color), the green color (second color), and the yellow color (fifth color).

Figure 3B:
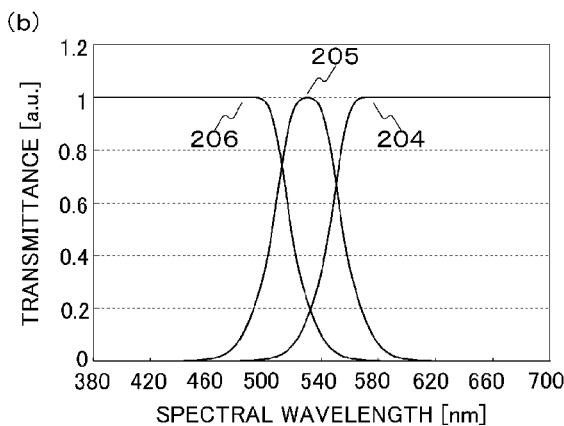

In the next place, FIG. 3B shows the spectral wavelength transmission characteristics (transmission spectrums) of the respective subpixels. Only the light in the green wavelength band is transmitted through the green subpixel 205. On the other hand, the light in the wavelength band ranging from the yellow color to the red color is transmitted through the red subpixel 204. Similarly, the light in the wavelength band ranging from the blue color to the cyan color is transmitted through the blue subpixel 206. In other words, the light emission spectrum of the green light source and the transmission spectrum of the red subpixel are overlapped in the yellow wavelength region. Further, the light emission spectrum of the green light source and the transmission spectrum of the blue subpixel are overlapped in the cyan wavelength region.

In this way, the green light source group 212 and the blue subpixel 206 fulfill the first condition such that the light emission spectrum of the green light source group 212 includes the cyan color as the color between the green color and the blue color, and the light of the cyan color is further transmitted through the blue subpixel 206. Further, the green light source group 212 and the red subpixel 204 fulfill the second condition such that the light emission spectrum of the green light source group 212 includes the yellow color as the color between the green color and the red color, and the light of the yellow color is further transmitted through the red subpixel 204.

Next, an explanation will be made about a method for extracting the five primary colors of the red color 301, the yellow color 302, the green color 303, the cyan color 304, and the blue color 305 by combining the light emission control of the respective light sources of the light source unit 109 and the transmission control of the respective subpixels of the liquid crystal unit 110.

FIG. 5 shows the relationship of turning ON of the respective light sources of the light source unit 109 and the relationship of transmission control of the respective subpixels of the liquid crystal unit 110 when the time sharing display is performed by dividing one frame into two subframes.

Figure 3C:
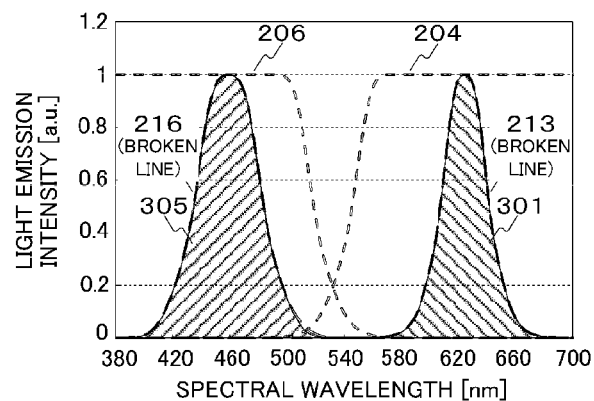
Figure 3D:
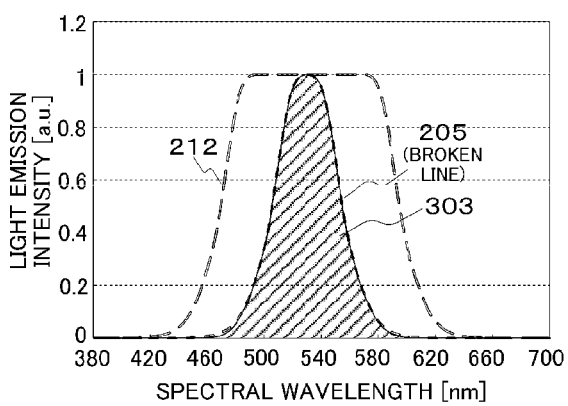

With reference to FIG. 5A, in the first subframe period, the red light source 213 and the blue light source 216 are turned ON, and the green light source group 212 is turned OFF. As for the subpixels, the transmission control is performed for the red subpixel 204 and the blue subpixel 206, and the green subpixel 205 is shielded from light (transmittance is controlled to have a minimum value). Accordingly, the light of the red color 301 and the light of the blue color 305 are transmitted. FIG. 3C shows this relationship. The spectral wavelength transmission characteristic of the red subpixel 204 provides the sufficiently wide band with respect to the spectral wavelength characteristic of the red light source 213. Therefore, the light of the red light source 213 is transmitted through the red subpixel 204 approximately exactly as it is, and the transmitted light of the red color 301 is obtained. A similar relationship is also provided between the blue light source 216 and the blue subpixel 206. The light of the blue light source 216 is transmitted through the blue subpixel 206 approximately exactly as it is, and the transmitted light of the blue color 305 is obtained.

In the second subframe period, only the green light source group 212 is turned ON, and the red light source 213 and the blue light source 216 are turned OFF. As for the subpixels, the transmission control is performed for the subpixels of all of the colors. Accordingly, the light of the yellow color 302, the light of the green color 303, and the light of the cyan color 304 are transmitted.

The display of the green color 303 will be explained on the basis of FIG. 3C. The green light source group 212 is the wide color representation light source, which has the wide spectral wavelength band. However, the spectral wavelength transmission characteristic of the green subpixel 205 has the narrow transmission characteristic having the peak in the green wavelength band. Therefore, the transmitted light of the green color 303 is obtained with the green subpixel 205.

Figure 3E:
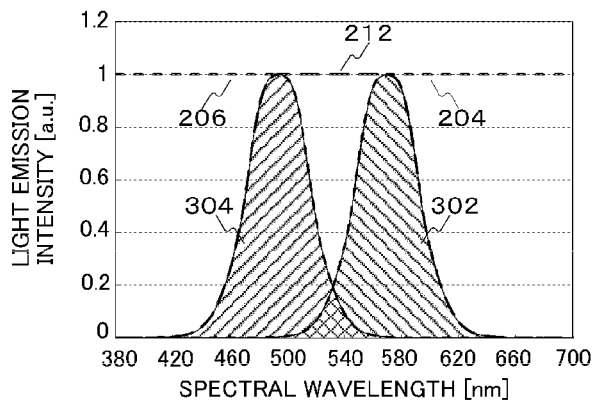

In the next place, an explanation will be made on the basis of FIG. 3E about the display of the yellow color 302 and the cyan color 304. When the light is transmitted through the red subpixel 204 during the period in which the green light source 212 is turned ON, the light of the wavelength, which is in such a band that the spectral wavelength band of the green light source group 212 and the spectral wavelength transmission characteristic of the red subpixel 204 are overlapped, is transmitted through the red subpixel 204. Accordingly, the transmitted light of the yellow color 302 is obtained with the red subpixel 204. Similarly, when the light is transmitted through the blue subpixel 206 during the period in which the green light source group 212 is turned ON, the light of the wavelength, which is in such a band that the spectral wavelength band of the green light source group 212 and the spectral wavelength transmission characteristic of the blue subpixel 206 are overlapped, is transmitted through the blue subpixel 206. Accordingly, the transmitted light of the cyan color 304 is obtained with the blue subpixel 206.

Figure 3F:
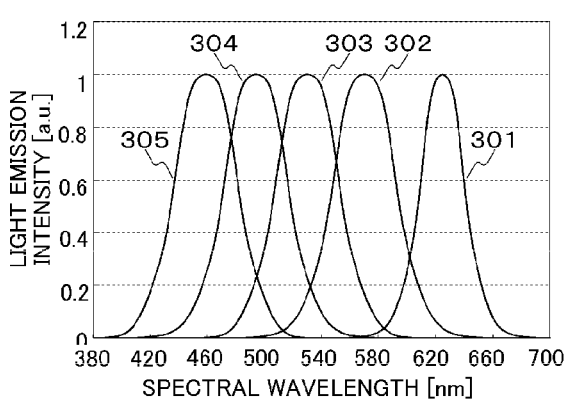
Figure 4:
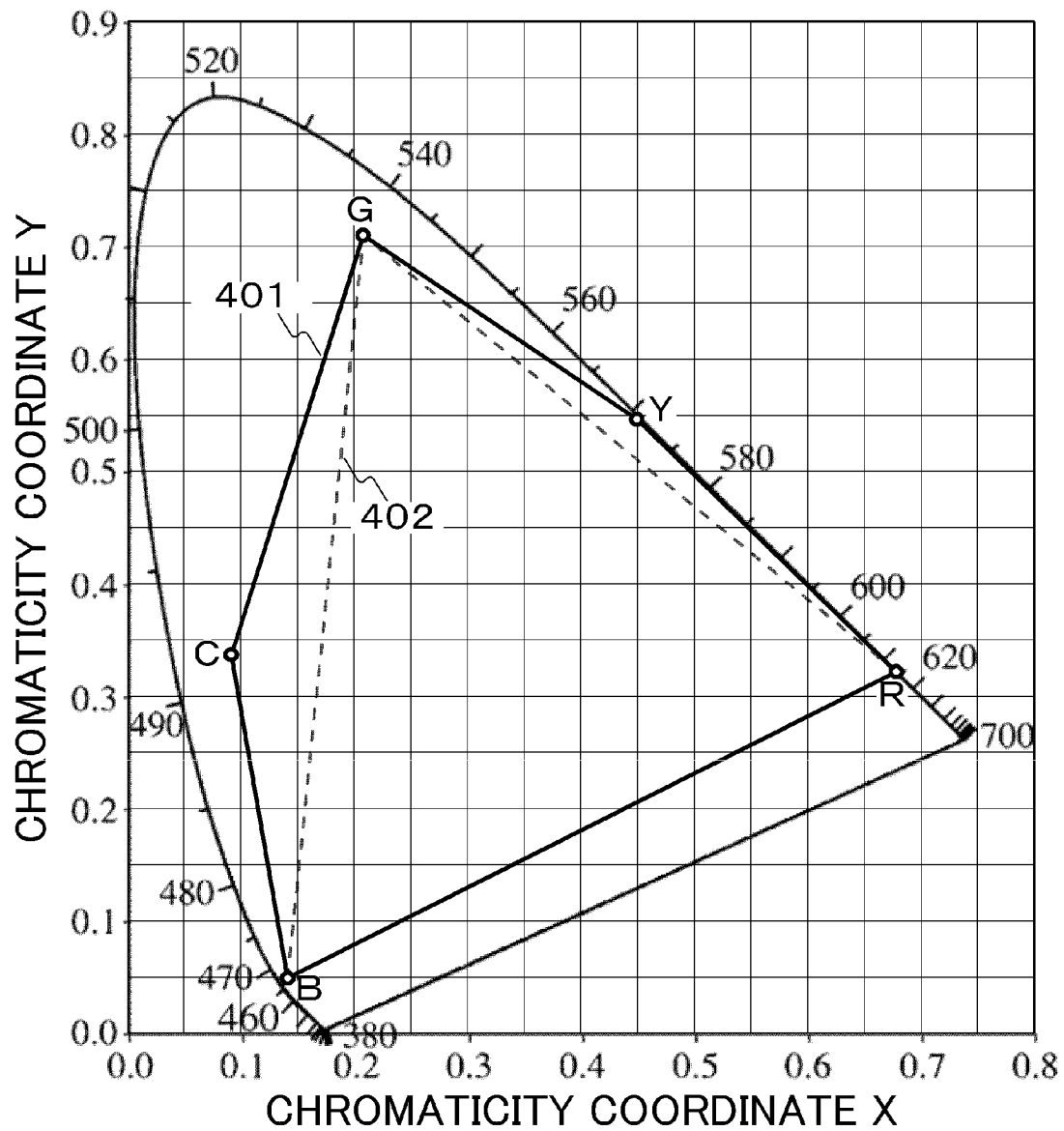
FIG. 4 shows a chromaticity diagram illustrating a color gamut area in which the color reproduction can be performed in the first embodiment.

The display period of one frame is divided into the plurality of periods of the first subframe period and the second subframe period to perform the time sharing display, and thus it is possible to perform the five primary color display with the red color 301, the yellow color 302, the green color 303, the cyan color 304, and the blue color 305 having the spectral wavelength characteristics as shown in FIG. 3F. Further, the light emission luminances of the respective colors are controlled, and thus it is possible to perform the color reproduction in a color gamut area indicated by a pentagon 401 (R-Y-G-C-B) shown in FIG. 4. For the purpose of reference, the color gamut area, which is indicated by a triangle 402 (R-G-B) shown in FIG. 4, represents a color gamut area in which the color reproduction can be performed by means of the three primary color display of the red color 301, the green color 303, and the blue color 305. According to the result of comparison, it is possible to confirm that the reproducible color gamut area is expanded by providing the five primary color display.

Figure 6:
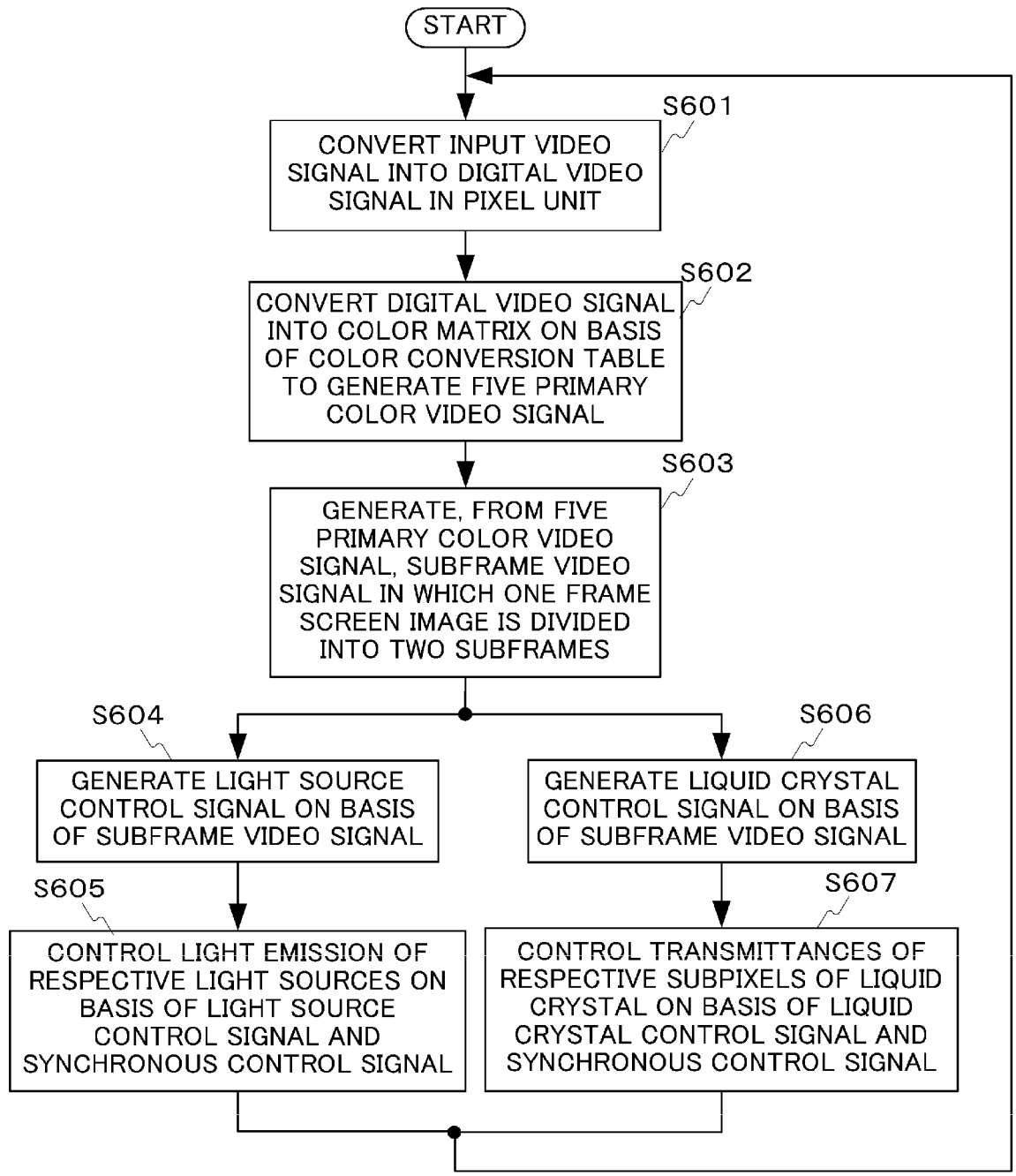
FIG. 6 shows a flowchart illustrating the operation of the liquid crystal display processing unit of the first embodiment.

Next, an explanation will be made in further detail below about the internal process performed by the liquid crystal display processing unit 100 by using a flow chart shown in FIG. 6.

In Step S601, the input video signal, which is inputted from the outside, is converted by the video data converting unit 101 into the digital video signal in pixel unit in conformity with the display resolution of the liquid crystal unit 110, and the signal is outputted to the color matrix converting unit 102. The routine proceeds to Step S602. In this case, the YUV format is assumed as the format of the digital video signal. However, the video signal format is not limited thereto provided that the signal can be correctly transmitted to the color matrix converting unit 102 while suppressing the color gamuts of various input screen images from being narrowed.

In Step S602, the color matrix converting unit 102 performs the color matrix conversion in which the respective pixel colors are divided or classified into the five primary color components capable of being displayed with the subpixels, on the basis of the digital video signal inputted from the video data converting unit 101. The video signal after the conversion is outputted as the five primary color video signal to the subframe dividing unit 103. The routine proceeds to Step S603. A color conversion table, which is previously optimized and adapted to the five primary colors capable of being displayed with the subpixels of the video display apparatus, is used for the color matrix conversion. Accordingly, the conversion is performed into the five primary color video signal wherein the digital video signal, which is expressed by means of the three axes, is subjected to the replacement with the five primary color components.

In Step S603, the five primary color video signal for each of the frames (image data of one frame), which is inputted from the color matrix converting unit 102, is divided by the subframe dividing unit 103 into the image data of the two subframes. The signal is divided into the first subframe image data which is composed of the pixel data of the red color 301 and the blue color 305 to be displayed in the first subframe period and the second subframe image data which is composed of the pixel data of the yellow color 302, the green color 303, and the cyan color 304 to be displayed in the second subframe period. The signal is generated as the subframe video signal which is outputted to the light source control signal generating unit 104 and the liquid crystal control signal generating unit 105. Further, the subframe sync signal is generated on the basis of the subframe video signal, which is outputted to the synchronous control unit 106. The routine proceeds to Step S604 and Step S606.

Although not described on the flow chart, the synchronous control unit 106 generates the synchronous control signal in order to effect the synchronization of the light source turning ON of the light source unit 109 and the driving of the liquid crystal unit 110 on the basis of the subframe sync signal supplied from the subframe dividing unit 103. The generated synchronous control signal is outputted to the light source control unit 107 and the liquid crystal control unit 108.

In Step S604, the light source control signal generating unit 104 generates the light source control signal in order to control the light emission of the light source unit 109 on the basis of the subframe image data inputted from the subframe dividing unit 103. The light source control signal is the control signal which is provided in order that the red light source 213 and the blue light source 216 are turned ON in the first subframe period and the green light source group 212 is turned ON in the second subframe period. The generated light source control signal is outputted to the light source control unit 107. The routine proceeds to Step S605.

In Step S605, the light source control unit 107 determines the light sources to be turned ON in each of the subframe periods on the basis of the light source control signal inputted from the light source control signal generating unit 104. The light source unit 109 is subjected to the light emission control in synchronization with the control timing of the liquid crystal unit 110 in accordance with the synchronous control signal supplied form the synchronous control unit 106. The designated light sources of the light source unit 109 (designated light sources designated by the light source control signal) are turned ON (lightened) in accordance with the control. The routine returns to Step S601, and the process of this flow chart is repeated.

In Step S606, the liquid crystal control signal generating unit 105 generates the liquid crystal control signal in order to realize the liquid crystal orientation angle for allowing the transmittance of each of the subpixels to be the designated transmittance, on the basis of the subframe video signal inputted from the subframe dividing unit 103. The generated liquid crystal control signal is outputted to the liquid crystal control unit 108.

In the first subframe period, the transmittance of the red subpixel is controlled in accordance with the pixel data of the red color of the image data of the first subframe. Further, the transmittance of the green subpixel is controlled to the shielding or blackout (minimum value). Further, the transmittance of the blue subpixel is controlled in accordance with the pixel data of the blue color of the image data of the first subframe.

In the second subframe period, the transmittance of the red subpixel is controlled in accordance with the pixel data of the yellow color of the image data of the second subframe. Further, the transmittance of the green subpixel is controlled in accordance with the pixel data of the green color of the image data of the second subframe. Further, the transmittance of the blue subpixel is controlled in accordance with the pixel data of the cyan color of the image data of the second subframe. The routine proceeds to Step S607.

In Step S607, the liquid crystal control unit 108 controls the liquid crystal orientation angle of each of the subpixels of the liquid crystal unit 110 on the basis of the liquid crystal control signal inputted from the liquid crystal control signal generating unit 105. The liquid crystal unit 110 is driven and controlled in synchronization with the control timing of the light source unit 109 in accordance with the synchronous control signal supplied from the synchronous control unit 106. Accordingly, the transmittances of the subpixels of the liquid crystal unit 110 are changed. The routine returns to Step S601, and the process of this flow chart is repeated for each one frame.

The display period of one frame is divided into the two subframe periods in accordance with the system and the control as described above, and the image data of one frame is divided into the image data of the two subframes to perform the time sharing display. The light sources to be turned ON are switched in the respective subframe periods. In one subframe period, the light source, which includes the cyan color and the yellow color in the light emission wavelength, is turned ON, and the subpixel of the liquid crystal unit 110 including the cyan color in the transmission wavelength and the subpixel of the liquid crystal unit 110 including the yellow color in the transmission wavelength are subjected to the transmission control. Accordingly, it is possible to realize the subpixel in which the transmitted light is the yellow color 302 as the color between the red color 301 and the green color 303 and the subpixel in which the transmitted light is the cyan color 304 as the color between the green color 303 and the blue color 305. Therefore, it is possible to perform the five primary color display by means of the red color 301, the yellow color 302, the green color 303, the cyan color 304, and the blue color 305. In other words, it is possible to expand the displaceable color gamut area as compared with the three primary color display without adding any light source of any other color to the light sources of the red color, the green color, and the blue color without adding any subpixel of any other color to the subpixels of the red color, the green color, and the blue color.

A liquid crystal display apparatus and a method for controlling the same, which include such a system that the display is performed with a number of primary colors larger than a number of colors of light sources by obtaining at least one neutral color by combining the light sources and the subpixels to fulfill the conditions as described above, are included in the scope of the present invention. In other words, it is also allowable to provide such a system that only any one of the yellow color 302 and the cyan color 304 is obtained. For example, it is assumed that the blue color is the first color, the blue light source is the first light source, the blue subpixel is the first subpixel, the green color is the second color, the green light source is the second light source, the green subpixel is the second subpixel, the cyan color is the fourth color, the red color is the third color, the red light source is the third light source, and the red subpixel is the third subpixel. As shown in FIG. 5B, in the first subframe period, the light of the blue color is obtained as the transmitted light through the blue subpixel by turning ON the blue light source, and the light of the red color is obtained as the transmitted light through the red subpixel by turning ON the red light source. In the second subframe period, the light of the cyan color is obtained as the transmitted light through the blue subpixel, and the light of the green color is obtained as the transmitted light through the green subpixel by turning ON the green light source. The red subpixel is shielded or subjected to the blackout (transmittance is minimum). Accordingly, it is possible to perform the four primary color display of the red color, the green color, the blue color, and the cyan color by means of the light sources and the subpixels of the three colors of the red color, the green color, and the blue color. Similarly, it is possible to perform the four primary color display of the red color, the green color, the blue color, and the yellow color by controlling the transmission of the red subpixel and shielding the blue subpixel in the second subframe period. A liquid crystal display apparatus, which is constructed as described above, which includes the light sources and the subpixels of the blue color, the green color, and the red color, and which performs the light emission control of the light sources by divining the display period of one frame into the plurality of subframe periods including at least the first subframe period and the second subframe period, is included in the present invention. In the case of the system in which the four primary color display is performed as described above, it is enough that any one of the first condition and the second condition holds. That is, it is enough that only the first condition holds in relation to the four primary color display of the red color, the green color, the blue color, and the cyan color. Further, it is enough that only the second condition holds in relation to the four primary color display of the red color, the green color, the blue color, and the yellow color. If both of the first condition and the second condition simultaneously hold, it is not necessarily indispensable that the five primary color display of the red color, the green color, the blue color, the cyan color, and the yellow color described above should be performed. It is also allowable to perform any one of the two types of the four primary color display.

This embodiment is illustrative of the exemplary case in which the time sharing display is performed while dividing the display period of one frame into the first subframe period and the second subframe period. However, it is also allowable that the time sharing display is performed while dividing the display period of one frame into the first subframe period, the second subframe period, and the third subframe period. For example, in the first subframe period, the red light source 213 is turned ON, and the green light source group 212 and the blue light source 216 are turned OFF. As for the subpixels, the transmission control is performed for the red subpixel 204, and the green subpixel 205 and the blue subpixel 206 are shielded (controlled so that the transmittance has the minimum value). Accordingly, the light of the red color 301 is transmitted. In the second subframe period, only the green light source group 212 is turned ON, and the red light source 213 and the blue light source 216 are turned OFF. As for the subpixels, the transmission control is performed for the subpixels of all of the colors. Accordingly, the light of the yellow color 302, the light of the green color 303, and the light of the cyan color 304 are transmitted. In the third subframe period, the blue light source 216 is turned ON, and the green light source group 212 and the red light source 213 are turned OFF. As for the subpixels, the transmission control is performed for the blue subpixel 206, and the green subpixel 205 and the red subpixel 204 are shielded (controlled so that the transmittance has the minimum value). Accordingly, the light of the blue color 305 is transmitted. Also in this case, it is possible to perform the five primary color display by means of the red color 301, the yellow color 302, the green color 303, the cyan color 304, and the blue color 305. It is also allowable to adopt such a system that only any one of the yellow color 302 and the cyan color 304 is obtained in the second subframe period.

Second Embodiment

A second embodiment of the present invention will be explained below. The difference from the first embodiment is as follows. That is, the second embodiment differs in that light sources, which have different spectral wavelength peaks, are combined for the first green light source 214 and the second green light source 215, in place of the use of the wide color representation light source as the green light source group 212. Those of the arrangement and the internal process of the liquid crystal display processing unit 100 and the structure of the liquid crystal module, which are equivalent to those of the first embodiment, are omitted from the explanation.

Figure 7A:
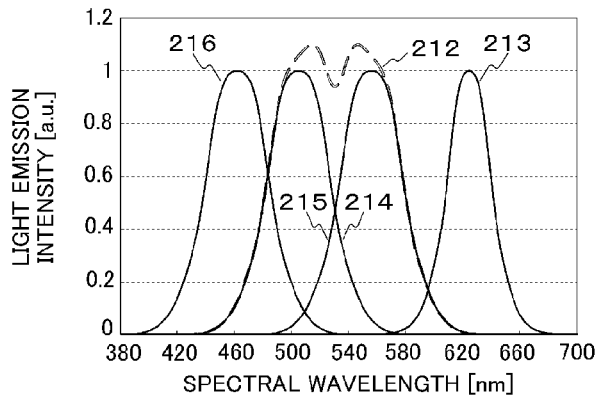
FIG. 7 shows wavelength characteristics of light sources, transmitted lights, and subpixels of a second embodiment.

FIG. 7A shows the spectral wavelength characteristics of the respective light sources in the second embodiment. The first green light source 214 and the second green light source 215 are the light sources which have the narrow bands and which have the different spectral wavelength peaks. The green light source group, which is obtained by combining or synthesizing the two, has the spectral wavelength characteristic as indicated by a broken line 212. The first green light source 214 is composed of a light-emitting element having a peak at a first green color which is near to the cyan color. The second green light source 215 is composed of a light-emitting element having a peak at a second green color which is near to the yellow color.

Figure 7B:
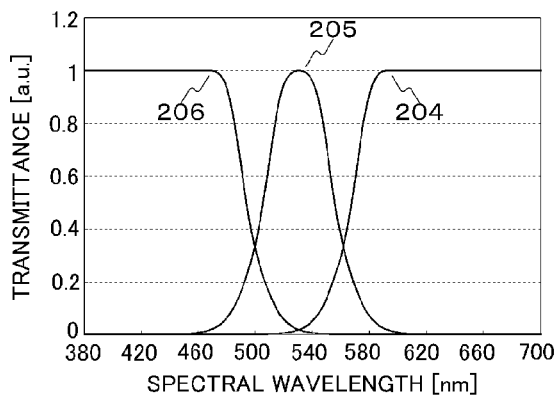

In the next place, FIG. 7B shows the spectral wavelength transmission characteristics of the respective subpixels. In order to obtain the subpixel transmitted light of the green color 703 from the green light source group 212, the spectral wavelength transmission band of the green subpixel 205 is widened and optimized, as compared with the spectral wavelength transmission characteristic of the subpixel in the first embodiment shown in FIG. 3B. In conformity therewith, the spectral wavelength attenuation characteristics of the red subpixel 204 and the blue subpixel 206 are changed, the attenuation start wavelength of the red subpixel 204 is deviated toward the longer wavelength as compared with the first embodiment, and the attenuation start wavelength of the blue subpixel 206 is deviated toward the shorter wavelength as compared with the first embodiment. The feature, in which the light emission spectrum of the green light source and the transmission spectrum of the red subpixel are overlapped in the wavelength region of the yellow color and the light emission spectrum of the green light source and the transmission spectrum of the blue subpixel are overlapped in the wavelength region of the cyan color, is the same as or equivalent to that of the first embodiment. In other words, the light sources and the subpixels of the respective colors of this embodiment fulfill the first condition and the second condition described above. The role of the color filter is the same as or equivalent to that of the first embodiment.

The image of one frame is displayed in a time sharing manner by dividing one frame into two subframe periods and dividing the image data of one frame into the image data of the two subframes in the same manner as in the first embodiment. Further, the light emission control of the respective light sources of the light source unit 109 and the transmission control of the respective subpixels of the liquid crystal unit 110 are combined, and thus the subpixel transmitted lights are obtained for the five primary colors of the red color 701, the yellow color 702, the green color 703, the cyan color 704, and the blue color 705.

Figure 7C:
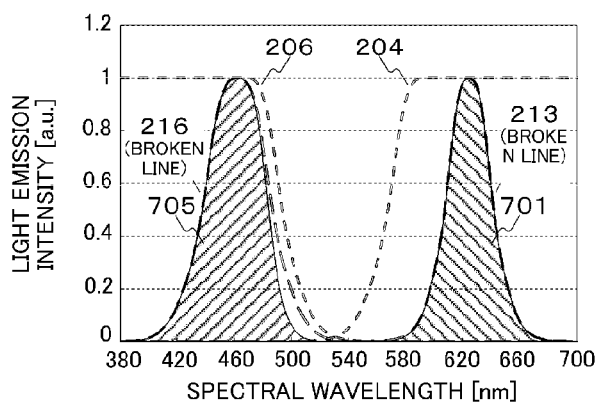

In the first subframe period, the red light source 213 (fourth light source) and the blue light source 216 (first light source) are turned ON, and the green light source group 212 (second and third light sources) is turned OFF. As for the subpixels, the transmission control is performed for the red subpixel 204 (third subpixel) and the blue subpixel 206 (first subpixel), and the green subpixel 205 (second subpixel) is shielded from light. Accordingly, the subpixel transmitted light of the red color 701 (fourth color) and the subpixel transmitted light of the blue color 705 (first color) are obtained. This relationship is shown in FIG. 7C.

Figure 7D:
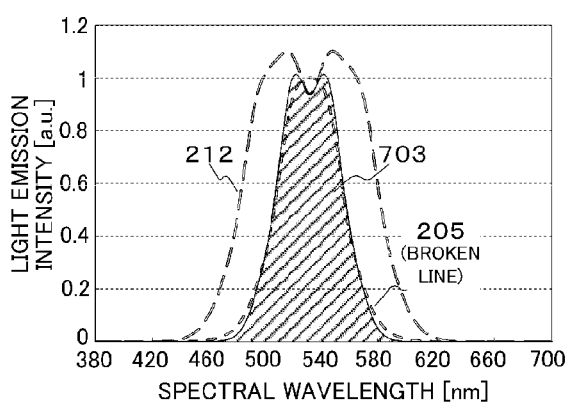
Figure 7E:
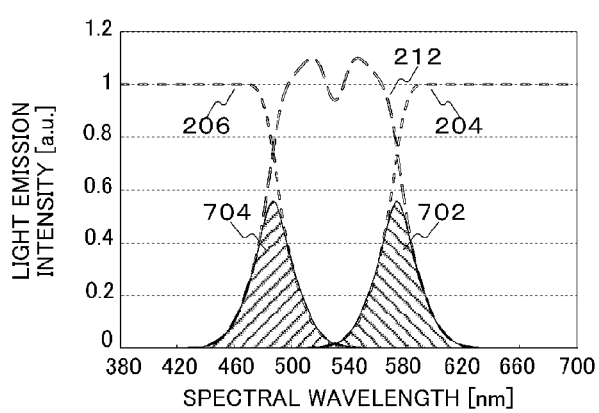

In the second subframe period, the green light source group 212 (second and third light sources) is turned ON, and the red light source 213 (fourth light source) and the blue light source 216 (first light source) are turned OFF. As for the subpixels, the transmission control is performed for the subpixels of all of the colors (first to third subpixels). Accordingly, the subpixel transmitted light of the yellow color 702 (seventh color), the subpixel transmitted light of the green color 703 (fifth color), and the subpixel transmitted light of the cyan color 704 (sixth color) are obtained. As shown in FIG. 7D, the subpixel transmitted light of the green color 703 is obtained by the combination of the green light source group 212 and the green subpixel 205. Further, as shown in FIG. 7E, the subpixel transmitted light of the yellow color 702 is obtained by the combination of the green light source group 212 and the red subpixel 204. Similarly, the subpixel transmitted light of the cyan color 704 is obtained by the combination of the green light source group 212 and the blue subpixel 206.

Figure 7F:
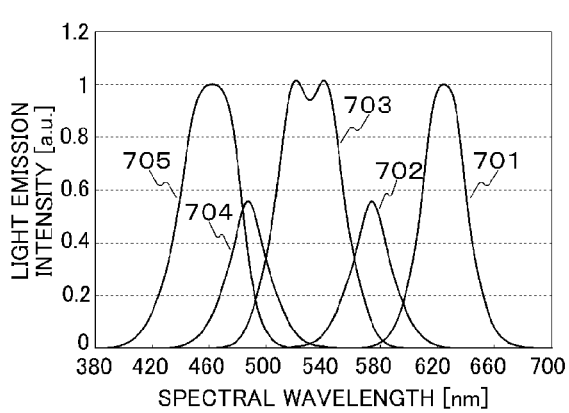

As a result, it is possible to perform the five primary color display based on the red color 701, the yellow color 702, the green color 703, the cyan color 704, and the blue color 705 having the spectral wavelength characteristics shown in FIG. 7F in accordance with the time sharing display based on the use of the first subframe and the second subframe. Further, it is possible to effect the color reproduction in a color gamut area indicated by a pentagon 801 (R-Y-G-C-B) shown in FIG. 8A by controlling the light emission luminances of the respective colors. It is possible to confirm that the expressible color gamut area is expanded by providing the five primary color display as compared with the color gamut area in which the color reproduction can be performed by means of the three primary color display as indicated by a triangle 802 (R-G-B) shown in FIG. 8A.

FIG. 8B shows the relationship of turning ON of the respective light sources of the light source unit 109 and the relationship of transmission control of the respective subpixels of the liquid crystal unit 110 when the time sharing display is performed by dividing one frame into two subframes. As shown in FIG. 8B, it is also allowable that the red subpixel is shielded from light (transmittance is minimized) in the second subframe period. Accordingly, it is possible to perform the four primary color display with the red color, the green color, the blue color, and the cyan color. Similarly, it is possible to perform the four primary color display with the red color, the green color, the blue color, and the yellow color by controlling the transmission of the red subpixel and shielding the blue subpixel from light in the second subframe period.

In the second embodiment, the overlap between the light emission spectrum of the green light source group and the transmission spectrums of the red subpixel and the blue subpixel is small. Therefore, the light emission intensities of the yellow color 702 and the cyan color 704 are smaller than those of the red color 701, the green color 703, and the blue color 705. In this situation, the displayable color gamut area can be expanded to the area 801 shown in FIG. 8 in the case of the five primary color display within a range not exceeding the upper limits of the light emission luminances of the yellow color 702 and the cyan color 704. However, in the case of the five primary color display exceeding the upper limits of the light emission luminances of the yellow color 702 and the cyan color 704, the displaceable color gamut area is shrunk or contracted within a range of an area 802 shown in FIG. 8 from the area 801 shown in FIG. 8. In view of the above, it is also appropriate to adopt the following procedure. That is, the light emission luminance of the green light source group 212 is enhanced as compared with the light emission luminances of the light sources of the other colors, and the transmittance of the green subpixel 205 is decreased depending on the light emission luminance of the green light source group 212. Thus, the green color 703 is subjected to the dimming regulation, and the light emission luminances of the yellow color 702 and the cyan color 704 are raised.

According to the arrangement and the control as described above, even when the replacement is performed for the green light source group 212 by using one combined set of the two light sources having the different spectral wavelength peaks in place of the wide color representation light source, the effect, which is the same as or equivalent to that of the first embodiment, is provided. That is, it is possible to expand the displaceable color gamut area as compared with the three primary color display, without providing any subpixel and any light source of any other color in addition to the subpixels and the light sources of the red color, the green color, and the blue color.

Third Embodiment

An explanation will be made below with reference to FIGS. 9 and 10 about a third embodiment of the present invention.

The third embodiment has the following feature. That is, the subpixel transmitted light of the first yellow color 902 and the subpixel transmitted light of the first cyan color 904 are obtained in the second subframe period in the same manner as in the first and second embodiments. Further, in the first subframe period, the subpixel transmitted light of the second cyan color 906 is obtained.

The structures of the liquid crystal display processing unit 100 and the liquid crystal module are provided correspondingly to those of the first embodiment, any explanation of which is omitted. Different portions will be described and explained later on about the internal process performed by the liquid crystal display processing unit 100.

An explanation will be made on the basis of FIG. 10A. In the second subframe period, the green light source group 212 causes the transmission through the red subpixel 204 to display the first yellow color 902 thereby, and the green light source group 212 causes the transmission through the blue subpixel 206 to display the first cyan color 904 thereby. Therefore, the light emission luminances of the first yellow color 902 and the first cyan color 904 can be individually adjusted by controlling the transmittances of the red subpixel 204 and the blue subpixel 206 respectively. This procedure is based on the following fact. That is, the light emission spectrum of the green light source and the transmission spectrum of the red subpixel are overlapped in the wavelength region of the first yellow color, and the light emission spectrum of the green light source and the transmission spectrum of the blue subpixel are overlapped in the wavelength region of the first cyan color.

On the other hand, the following situation is assumed. That is, the light emission spectrum of the red light source and the transmission spectrum of the green subpixel are overlapped in the wavelength region of the second yellow color, and the light emission spectrum of the blue light source and the transmission spectrum of the green subpixel are overlapped in the wavelength region of the second cyan color. On this assumption, in the first subframe period, the red light source 213 causes the transmission through the green subpixel 205 to display the second yellow color (seventh color) thereby, and the blue light source 216 causes the transmission through the green subpixel 205 to display the second cyan color 906 (sixth color) thereby. In other words, the second yellow color and the second cyan color 906 are displayed by color mixture by using the green subpixel 205 in the both cases. Therefore, when the transmittance of the green subpixel 205 is controlled, it is impossible to independently adjust the light emission luminances of the second yellow color and the second cyan color 906.

In view of the above, in the third embodiment, the spectral wavelength transmission characteristic of the green subpixel 205 is allowed to have such a spectral wavelength transmission characteristic that the light in the spectral wavelength band of the red light source 213 is shielded of shut off. In other words, the light emission spectrum of the red light source and the transmission spectrum of the green subpixel are not overlapped, and thus the light of the red light source 213 is suppressed from leakage from the green subpixel 205. Accordingly, as shown in FIG. 10B, only the second cyan color 906 is extracted by using the green subpixel 205 in the first subframe period. Accordingly, in the first subframe period, the light of the second cyan color 906 is transmitted by using the green subpixel 205, and the transmittance of the green subpixel is controlled. Thus, it is possible to adjust the light emission luminance of the second cyan color 906.

Figure 9A:
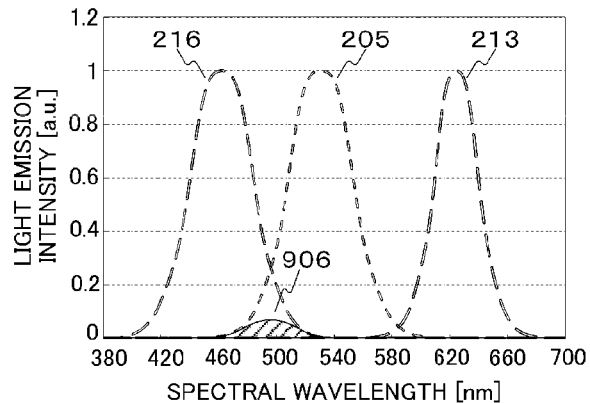
FIG. 9 shows wavelength characteristics of transmitted lights in a third embodiment.

An explanation will be made about the case in which the second cyan color 906 is displayed by using the arrangements of the light source unit 109 and the liquid crystal unit 110 of the second embodiment as they are. As shown in FIG. 9A, when the transmission is caused through the green subpixel 205 during the period in which the blue light source 216 is turned ON, the light of the wavelength, which is in such a band that the spectral wavelength characteristic of the blue light source 216 and the spectral wavelength transmission characteristic of the green subpixel 205 are overlapped, is transmitted through the green subpixel 205. Accordingly, the transmitted light of the second cyan color 906 is obtained with the green subpixel 205.

Figure 9B:
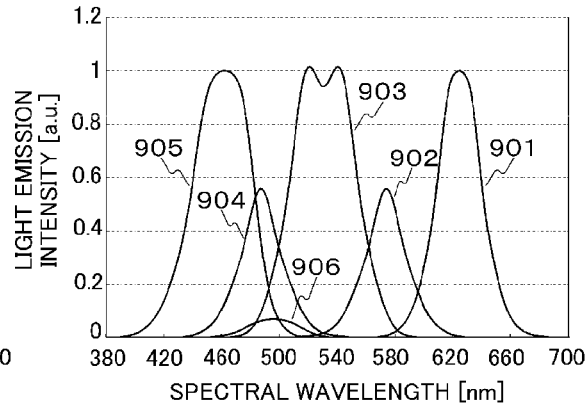
Figure 9C:
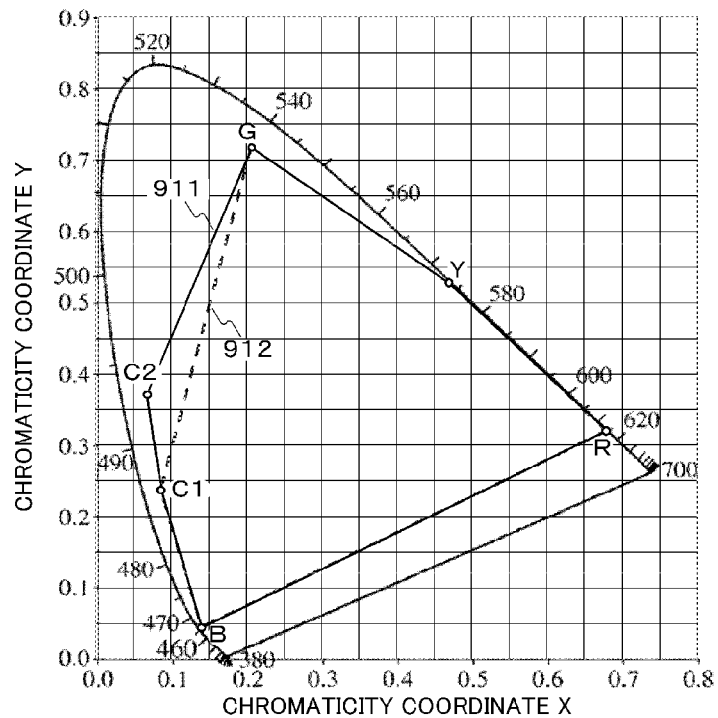

As a result, it is possible to perform the six primary color display by using the red color 901, the first yellow color 902, the green color 903, the first cyan color 904, the second cyan color 906, and the blue color 905 having the spectral wavelength characteristics shown in FIG. 9B in accordance with the time sharing display by using the first subframe and the second subframe. Further, it is possible to perform the color reproduction in a color gamut area indicated by a hexagon 911 (R-Y-G-C2-C1-B) shown in FIG. 9C by controlling the light emission luminances of the respective colors. It is possible to confirm that the reproducible color gamut area is further expanded by providing the six primary color display as compared with the color gamut area in which the color reproduction can be performed by means of the five primary color display as indicated by an area 912 shown in FIG. 9C in the case of the second embodiment.

Owing to the fact that the six primary color display can be performed, the color matrix conversion is performed by the color matrix converting unit 102 by using a preset six primary color conversion table for the digital video signal to generate a six primary color video signal in place of the five primary color video signal. In the following blocks, the processes after the generation of the subframe video signal are performed on the basis of the six primary color video signal. In other words, the inputted image data of one frame is divided into the first subframe image data which is composed of the pixel data of the red color, the blue color, and the second cyan color and the second subframe image data which is composed of the pixel data of the green color, the yellow color, and the first cyan color.

In the first subframe period, the transmittance of the red subpixel is controlled depending on the pixel data of the red color of the image data of the first subframe. The transmittance of the green subpixel is controlled depending on the pixel data of the second cyan color of the image data of the first subframe. The transmittance of the blue subpixel is controlled depending on the pixel data of the blue color of the image data of the first subframe.

In the second subframe period, the transmittance of the red subpixel is controlled depending on the pixel data of the yellow color of the image data of the second subframe. The transmittance of the green subpixel is controlled depending on the pixel data of the green color of the image data of the second subframe. The transmittance of the blue subpixel is controlled depending on the pixel data of the first cyan color of the image data of the second subframe. Thus, the six primary color display is realized by the time sharing display.

In accordance with the arrangement and the control as described above, the green subpixel, which has such a transmission wavelength characteristic that the light emission wavelength band of any one of the light sources (red light source in this case) is shielded of shut off, is further subjected to the transmission control in the subframe period in which the two light sources of the red color and the blue color are turned ON, as compared with the first and second embodiments. Accordingly, the second cyan color 906, which is the color between the green color 903 and the blue color 905, can be extracted by using the first subframe. Thus, it is possible to perform the six primary color display by means of the red color 901, the yellow color 902, the green color 903, the first cyan color 904, the second cyan color 906, and the blue color 905.

The explanation has been made about the extraction of the second cyan color 906 by using the first subframe. However, in an opposite manner, it is also possible to extract the second yellow color by allowing the transmission characteristic of the green subpixel 205 to be such a transmission wavelength characteristic that the light emission wavelength band of the blue light source 216 is shielded or shut off. In other words, the light emission spectrum of the blue light source and the transmission spectrum of the green subpixel are not overlapped, and the light emission spectrum of the red light source and the transmission spectrum of the green subpixel are overlapped in the wavelength region of the second yellow color. The inputted image data of one frame is divided into the first subframe image data which is composed of the pixel data of the red color, the blue color, and the second yellow color and the second subframe image data which is composed of the pixel data of the green color, the first yellow color, and the cyan color.

In the first subframe period, the transmittance of the red subpixel is controlled depending on the pixel data of the red color of the image data of the first subframe. The transmittance of the green subpixel is controlled depending on the pixel data of the second yellow color of the image data of the first subframe. The transmittance of the blue subpixel is controlled depending on the pixel data of the blue color of the image data of the first subframe.

In the second subframe period, the transmittance of the red subpixel is controlled depending on the pixel data of the first yellow color of the image data of the second subframe. The transmittance of the green subpixel is controlled depending on the pixel data of the green color of the image data of the second subframe. The transmittance of the blue subpixel is controlled depending on the image data of the cyan color of the image data of the second subframe. Accordingly, it is possible to perform the six primary color display by means of the red color, the blue color, the green color, the cyan color, the first yellow color, and the second yellow color.

Fourth Embodiment

A fourth embodiment of the present invention will be explained below. The arrangement of the fourth embodiment resides in such a case that a light source, in which the spectral wavelength band is narrow while having a peak in the green wavelength band, is used without using the wide color representation light source or the light source having the different spectral wavelength peak for the green light source group 212. The arrangement and the internal process of the liquid crystal display processing unit 100 and the structure of the liquid crystal module are provided correspondingly to those of the first embodiment, any explanation of which is omitted. Further, the procedure to perform the six primary color display is provided correspondingly to the third embodiment, any explanation of which is omitted.

Figures 11A, 11B:
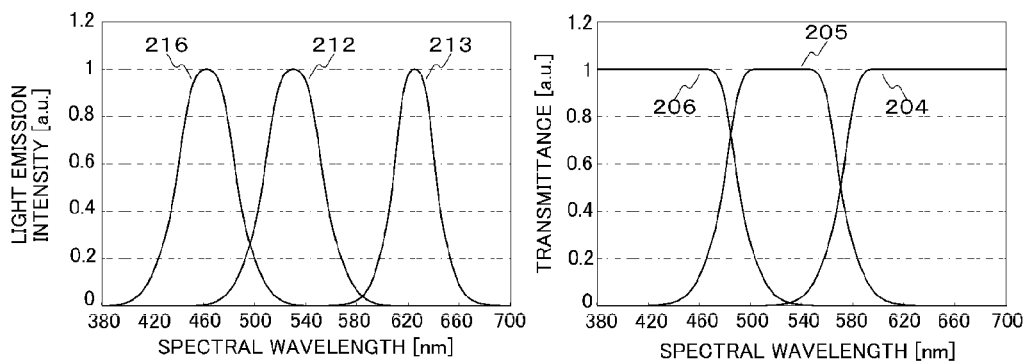
FIG. 11 shows wavelength characteristics of light sources, transmitted lights, and subpixels of a fourth embodiment.
Figures 11C, 11D:
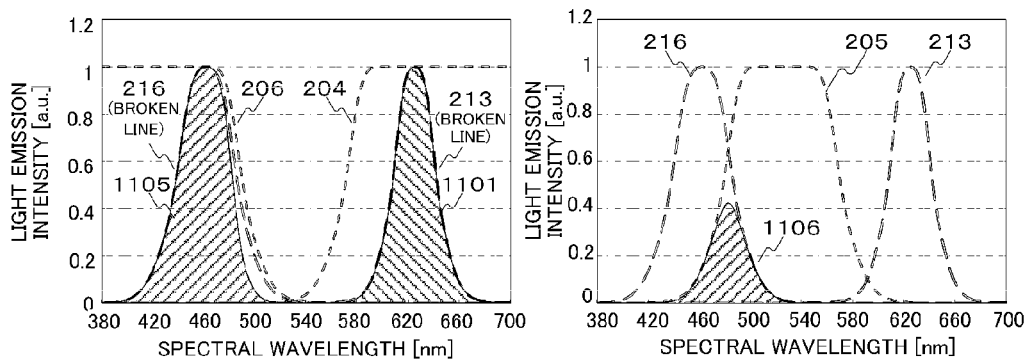
Figures 11E, 11F:
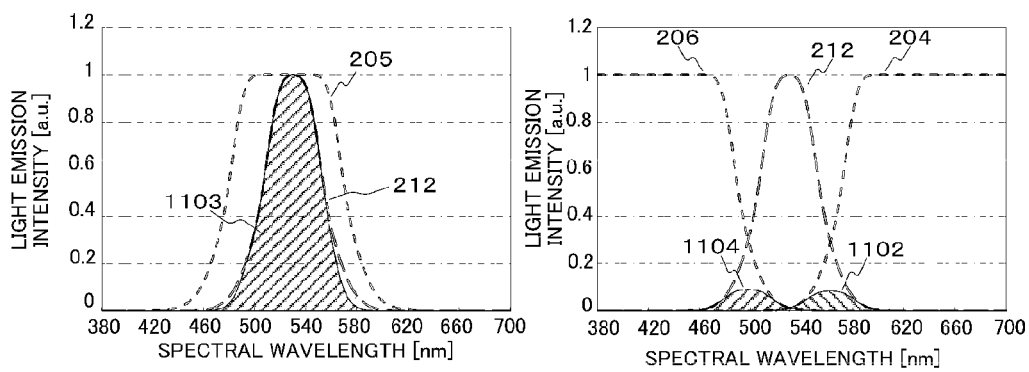

FIG. 11A shows the spectral wavelength characteristics of the red light source 213, the green light source group 212, and the blue light source 216 in the fourth embodiment. Further, FIG. 11B shows the spectral wavelength transmission characteristics of the red subpixel 204, the green subpixel 205, and the blue subpixel 206. The characteristic differences are combined, and the control is performed in the same manner as in the first and third embodiments. Accordingly, as shown in FIGS. 11C and 11D, the red color 1101, the blue color 1105, and the second cyan color 1106 are obtained in the first subframe period. Further, in the second subframe period, as shown in FIGS. 11E and 11F, the yellow color 1102, the green color 1103, and the first cyan color 1104 are obtained.

Figure 11G:
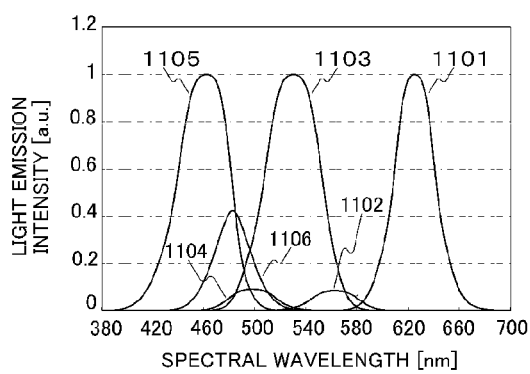
Figure 12:
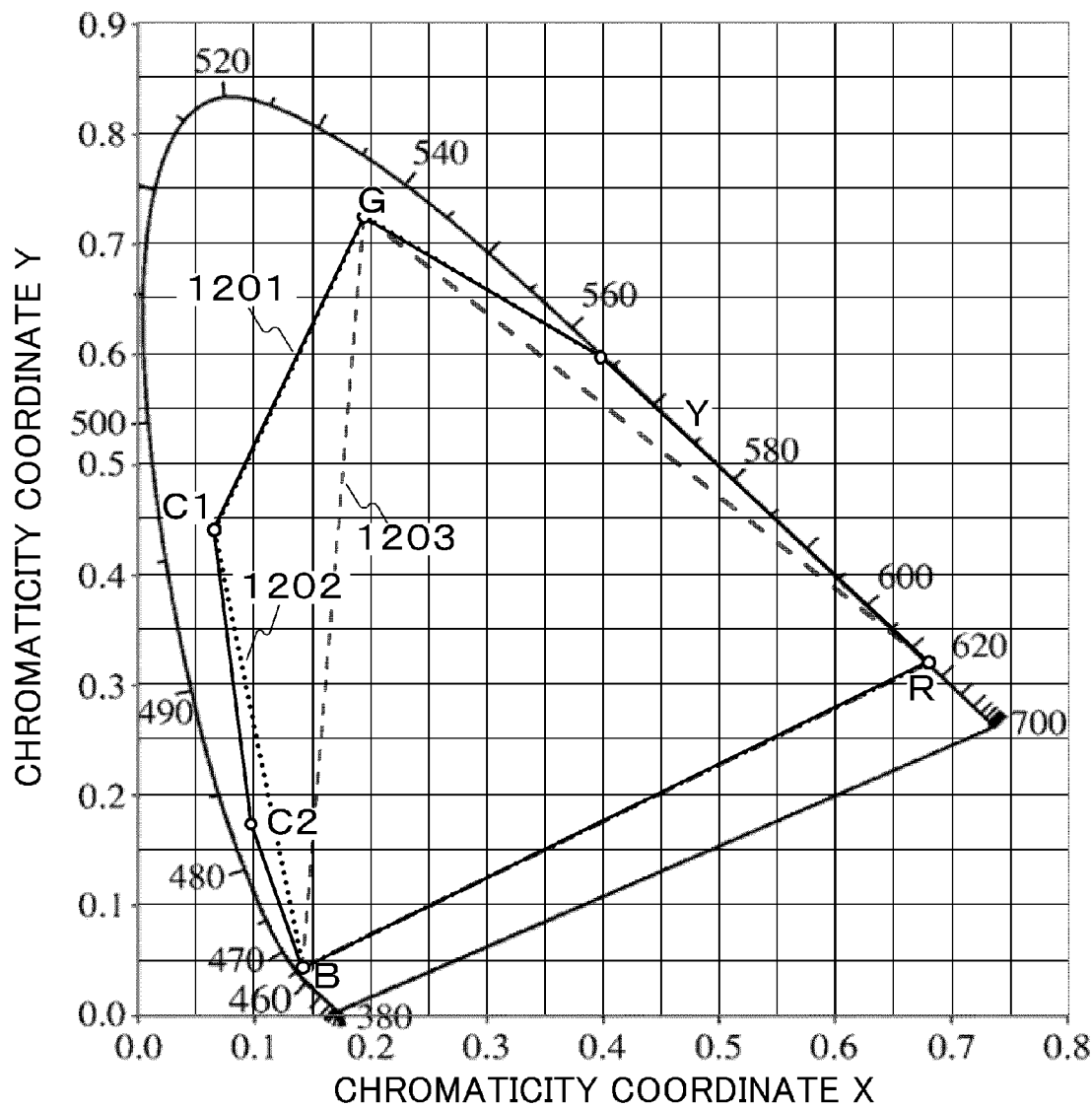
FIG. 12 shows a chromaticity diagram illustrating a color gamut area in which the color reproduction can be performed in the fourth embodiment.

It is possible to perform the six primary color display by means of the red color 1101, the yellow color 1102, the green color 1103, the first cyan color 1104, the second cyan color 1106, and the blue color 1105 having the spectral wavelength characteristics shown in FIG. 11G in accordance with the time sharing display by using the first subframe and the second subframe. The color gamut area, in which the color reproduction can be performed in this case, is an area indicated by a hexagon 1201 (R-Y-G-C1-C2-B) shown in FIG. 12. The color gamut area, in which the color reproduction can be performed by the five primary color display by means of the red color 1101, the yellow color 1102, the green color 1103, the first cyan color 1104, and the blue color 1105, is an area indicated by a pentagon 1202 (R-Y-G-C1-B) shown in FIG. 12. Further, the color gamut area, in which the color reproduction can be performed by the three primary color display by means of the red color 1101, the green color 1103, and the blue color 1105, is an area indicated by a triangle (R-G-B) shown in FIG. 12.

Therefore, even when the green light source group 212 is such a light source that the spectral wavelength band is narrow while having the peak in the green wavelength band, it is possible to perform the five primary color display and the six primary color display by switching the light source to be turned ON for each of the subframes in accordance with the time sharing display, without providing any new light source and any new subpixel. Accordingly, it is possible to expand the displaceable color gamut area as compared with the three primary color display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-102840, filed on May 2, 2011, and Japanese Patent Application No. 2012-038661, filed on Feb. 24, 2012, which are hereby incorporated by reference herein in their entirety.

What is claimed is:
1. A liquid crystal display apparatus comprising:
   a backlight which consists of a first light source for emitting light of a first color, a second light source for emitting light of a second color, and a third light source for emitting light of a third color;
   a liquid crystal panel which is an assembly of pixels consisting of first subpixels for transmitting the light of the first color therethrough, second subpixels for transmitting the light of the second color therethrough, and third subpixels for transmitting the light of the third color therethrough;
   a light source control unit which independently controls the light emission of the first light source, the second light source, and the third light source; and
   a liquid crystal control unit which controls transmittances of the first subpixels, the second subpixels, and the third subpixels depending on image data, wherein:
   the second light source, the first subpixel, and the third subpixel fulfill at least any condition of:

a first condition in which a light emission spectrum of the second light source further includes a fourth color as a color between the second color and the first color and the light of the fourth color is further transmitted through the first subpixel; and a second condition in which a light emission spectrum of the second light source further includes a fifth color as a color between the second color and the third color and the light of the fifth color is further transmitted through the third subpixel; and the light source control unit controls the light sources by dividing a display period of one frame into a plurality of subframe periods including:

such a first subframe period that, by turning ON the first light source and the third light source, the light of the first color is transmitted through the first subpixel and the light of the third color is transmitted through the third subpixel;

such a second subframe period that, by turning ON the second light source, the light of the second color is transmitted through the second subpixel, the light of the fourth color is transmitted through the first subpixel if the first condition is fulfilled, the light of the fifth color is transmitted through the third subpixel if the second condition is fulfilled, and the light of the fourth color is transmitted through the first subpixel and the light of the fifth color is transmitted through the third subpixel if both of the first condition and the second condition are both fulfilled; and a color gamut area in which color reproduction is performed by the liquid crystal display apparatus is wider than a color gamut defined by a triangle formed by the first color, the second color, and the third color.

2. The liquid crystal display apparatus according to claim 1, wherein:

the liquid crystal control unit controls, in the first subframe period, the transmittance of the first subpixel depending on data of the first color of the image data and the transmittance of the third subpixel depending on data of the third color of the image data; and the liquid crystal control unit controls, in the second subframe period, the transmittance of the second subpixel depending on data of the second color of the image data, the transmittance of the first subpixel depending on data of the fourth color of the image data if the light of the fourth color is transmitted through the first subpixel, and the transmittance of the third subpixel depending on data of the fifth color of the image data if the light of the fifth color is transmitted through the third subpixel.

3. The liquid crystal display apparatus according to claim 1, wherein the liquid crystal control unit controls the transmittance of the second subpixel to provide a minimum value in the first subframe period.

4. The liquid crystal display apparatus according to claim 1, wherein:

a light emission spectrum of the first light source includes a sixth color as a color between the first color and the second color;

light of the sixth color is further transmitted through the second subpixel and any light of any color included in a light emission spectrum of the third light source is not transmitted through the second subpixel; and the light source control unit operates such that the light of the first color is transmitted through the first subpixel, the light of the sixth color is transmitted through the second subpixel, and the light of the third color is transmitted through the third subpixel by turning ON the first light source and the third light source in the first subframe period.

5. The liquid crystal display apparatus according to claim 1, wherein:

a light emission spectrum of the third light source includes a seventh color as a color between the third color and the second color;

light of the seventh color is further transmitted through the second subpixel and any light of any color included in a light emission spectrum of the first light source is not transmitted through the second subpixel; and the light source control unit operates such that the light of the first color is transmitted through the first subpixel, the light of the seventh color is transmitted through the second subpixel, and the light of the third color is transmitted through the third subpixel by turning ON the first light source and the third light source in the first subframe period.

6. The liquid crystal display apparatus according to claim 1, wherein the first color is a blue color, the second color is a green color, the third color is a red color, the fourth color is a cyan color, and the fifth color is a yellow color.

7. A liquid crystal display apparatus comprising:

a backlight which consists of a first light source for emitting light of a first color, a second light source for emitting light of a second color, a third light source for emitting light of a third color, and a fourth light source for emitting light of a fourth color;

a liquid crystal panel which is an assembly of pixels consisting of first subpixels for transmitting the light of the first color therethrough, second subpixels for transmitting light of a fifth color as a color between the second color and the third color therethrough, and third subpixels for transmitting the light of the fourth color therethrough;

a light source control unit which independently controls the light emission of the first light source, the second light source, the third light source, and the fourth light source; and a liquid crystal control unit which controls transmittances of the first subpixels, the second subpixels, and the third subpixels depending on image data, wherein:

the second light source, the third light source, the first subpixel, and the third subpixel fulfill at least any condition of:

a first condition in which a light emission spectrum of the second light source further includes a sixth color as a color between the first color and the second color and the light of the sixth color is further transmitted through the first subpixel; and a second condition in which a light emission spectrum of the third light source further includes a seventh color as a color between the third color and the fourth color and the light of the seventh color is further transmitted through the third subpixel;

the light source control unit controls the light sources by dividing a display period of one frame into a plurality of subframe periods including:

such a first subframe period that, by turning ON the first light source and the fourth light source, the light of the first color is transmitted through the first subpixel and the light of the fourth color is transmitted through the third subpixel; and such a second subframe period that, by turning ON the second light source and the third light source, the light of the fifth color is transmitted through the second subpixel, the light of the sixth color is transmitted through the first subpixel if the first condition is fulfilled, the light of the seventh color is transmitted through the third subpixel if the second condition is fulfilled, and the light of the sixth color is transmitted through the first subpixel and the light of the seventh color is transmitted through the third subpixel if both of the first condition and the second condition are both fulfilled; and a color gamut area in which color reproduction is performed by the liquid crystal display apparatus is wider than a color gamut defined by a triangle formed by the first color, the fourth color, and the fifth color.

* * * * *